(12) United States Patent
Tseng

(10) Patent No.: US 9,071,137 B2
(45) Date of Patent: Jun. 30, 2015

(54) DRIVING CIRCUIT AND ERROR AMPLIFIER THEREOF

(71) Applicant: Himax Analogic, Inc., Tainan (TW)

(72) Inventor: Kuan-Jen Tseng, Tainan (TW)

(73) Assignee: HIMAX ANALOGIC, INC., Tainan (TW)

( * ) Notice: Subject to any disclaimer, the term of this patent is extended or adjusted under 35 U.S.C. 154(b) by 241 days.

(21) Appl. No.: 13/859,857

(22) Filed: Apr. 10, 2013

(65) Prior Publication Data

US 2014/0306679 A1 Oct. 16, 2014

(51) Int. Cl.
*H02M 3/156* (2006.01)

(52) U.S. Cl.
CPC .................................... *H02M 3/156* (2013.01)

(58) Field of Classification Search
CPC ........................................................ H02M 3/156
USPC .......... 323/271, 288, 242, 282–285; 330/253, 330/260
See application file for complete search history.

(56) References Cited

U.S. PATENT DOCUMENTS

| 6,975,100 | B2* | 12/2005 | Doppke et al. | 323/288 |
| 8,198,881 | B2* | 6/2012 | Tsukamoto | 323/288 |
| 2002/0075705 | A1* | 6/2002 | Bayer et al. | 363/59 |
| 2013/0307502 | A1* | 11/2013 | Bhattacharyya et al. | 323/282 |
| 2014/0266124 | A1* | 9/2014 | Wang | 323/288 |

\* cited by examiner

*Primary Examiner* — Gary L Laxton
*Assistant Examiner* — Kyle J Moody
(74) *Attorney, Agent, or Firm* — McClure, Qualey & Rodack, LLP

(57) ABSTRACT

An error amplifier and a driving circuit are disclosed herein. The error amplifier is configured to charge a compensation capacitor with an error current. The error amplifier includes an input stage, a main output stage, and an auxiliary output stage. The input stage is configured to provide a first differential output signal and a second differential output signal in response to a comparison between a reference voltage and a feedback voltage. The main output stage is configured to charge the compensation capacitor. The auxiliary output stage is configured to be activated to charge the compensation capacitor. a first operation, both the main output stage and the auxiliary output stage charge the compensation capacitor. In a second operation, the main output stage charges the compensation capacitor, and the auxiliary output stage is deactivated and does not charge the compensation capacitor.

20 Claims, 3 Drawing Sheets

DRIVING CIRCUIT AND ERROR AMPLIFIER THEREOF

BACKGROUND

1. Technical Field

The present disclosure relates to an electronic circuit. More particularly, the present invention relates to a driving circuit and an error amplifier thereof.

2. Description of Related Art

Light emitting diodes (LEDs) are in estimation four times as efficient as conventional incandescent lights. The LEDs are also considered to be more economically sound than compact fluorescent bulbs that contain environmentally harmful mercury required further processing, and are supposed to last longer than that the conventional lighting does. In this regard, the LEDs have been becoming the mainstream of the lighting technology.

A driving circuit for driving the LEDs includes an error amplifier for comparing a reference voltage with a feedback voltage to charge a compensation capacitor with an error current. The charge speed of the compensation capacitor corresponds to both the capacitance of the compensation capacitor and the magnitude of the error current. Generally, a high error current is required to charge the compensation capacitor quickly during a start-up period. However, such high error current may induce the oscillation of the driving circuit while the driving circuit is activated and in operation. Therefore, the compensation capacitor with a high capacitance, which undesirablly blocks the charge speed of the compensation capacitor, is still needed to keep the driving circuit from the oscillation.

Given the above, the dilemma of choosing between the capacitance of the compensation capacitor and the magnitude of the error current should be solved.

SUMMARY

One aspect of the present invention is directed to an error amplifier. In accordance with one embodiment of the present invention, the error amplifier is configured to charge a compensation capacitor with an error current. The error amplifier includes an input stage, a main output stage, and an auxiliary output stage. The input stage is configured to receive a reference voltage and a feedback voltage, and to provide a first differential output signal and a second differential output signal in response to a comparison between the reference voltage and the feedback voltage. The main output stage is configured to receive the first differential output signal and the second differential output signal, and to charge the compensation capacitor. The auxiliary output stage configured to receive the first differential output signal and the second differential output signal, and to be activated to charge the compensation capacitor. In a first operation, both the main output stage and the auxiliary output stage charge the compensation capacitor. In a second operation, the main output stage charges the compensation capacitor, and the auxiliary output stage is deactivated and does not charge the compensation capacitor.

Another aspect of the present invention is directed to a driving circuit In accordance with one embodiment of the present invention, the driving circuit includes an inductor, a driving transistor, an error amplifier, and a comparator. The inductor is electrically connected between a voltage supply and an operative node. The driving transistor is electrically connected to the operative node. The error amplifier electrically connected to a compensation capacitor, including an input stage, a main output stage, and an auxiliary output stage. The input stage is configured to provide a first differential output signal and a second differential output signal in response to a comparison between a fixed reference voltage and a varying feedback voltage. The main output stage configured to charge the compensation capacitor. The auxiliary output stage configured to be activated to charge the compensation capacitor. In a first operation, both the main output stage and the auxiliary output stage charge the compensation capacitor. In a second operation, the main output stage charges the compensation capacitor and the auxiliary output stage is deactivated and does not charge the compensation capacitor. The comparator is electrically connected to the compensation capacitor. The comparator is configured to provide a driving voltage to drive the driving transistor in response to a comparison between a ramp voltage and a compare voltage of the compensation capacitor.

Still another aspect of the present invention is directed to an error amplifier. In accordance with one embodiment of the present invention, the error amplifier includes an input stage, a first transistor, a second transistor, a third transistor, and a fourth transistor. The input stage is configured to receive reference voltage and a feedback voltage, and to provide a first differential output signal and a second differential output signal in response to a comparison between the reference voltage and the feedback voltage. The first transistor is electrically connected between a first voltage and a compensation capacitor, has a gate end configured to receive the first differential output signal. The second transistor is electrically connected between a second voltage and the compensation capacitor, has a gate end configured to receive the second differential output signal. The third transistor is electrically connected between the first voltage and the compensation capacitor, has a gate end configured to receive the first differential output signal. The fourth transistor is electrically connected between the second voltage and the compensation capacitor, having a gate end configured to receive the second differential output signal. In a first operation, the first transistor, the second transistor, the third transistor, and the fourth transistor are activated to charge the compensation capacitor with a relative high current. In a second operation, the first transistor and the second transistor are activated, and the third transistor and the fourth transistor are deactivated, such that the compensation capacitor is charged with a relative low current.

Thus, through application of one of the embodiments mentioned above, the error amplifier with an adjustable error current can be implemented. By charging the compensation capacitor operatively with both the main and the auxiliary output stage of the error amplifier or with merely the main output stage of the error amplifier, a stable driving circuit with a high start-up speed can be implemented.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
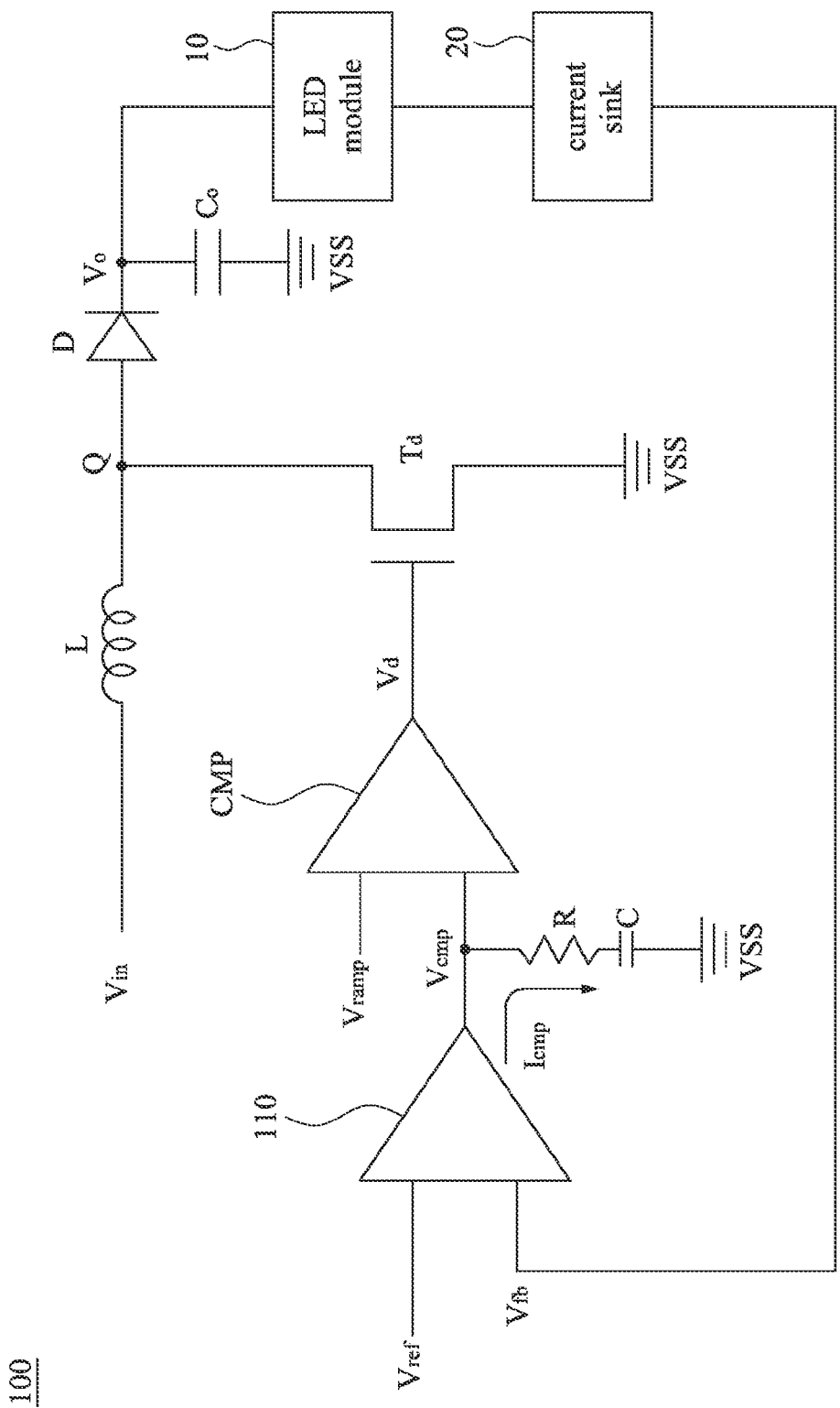
FIG. 1 is a schematic diagram of a driving circuit in accordance with one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

For the term "electrically connect" or "connect" used herein, both of them can refer to the physical contact or electrical contact performed directly or indirectly between two or more elements. The term "electrically connect" or "connect" can further refer to the interoperation or interaction between two or more elements.

One aspect of the invention provides a driving circuit. For the purpose of clear description, a LED driving circuit will be taken as an example in the following paragraphs. However, the invention is not limited to the embodiment following described.

FIG. 1 is a schematic diagram of a driving circuit 100 in accordance with one embodiment of the present disclosure. In this embodiment, the driving circuit 100 includes an inductor L, a driving transistor Td (e.g., a power MOSFET), an error amplifier 110, and a comparator CMP. The inductor L is electrically connected between a voltage supply Vin and an operative node Q. The driving transistor Td is electrically connected between the operative node Q and a voltage VSS. The comparator CMP is electrically connected to the gate end of the driving transistor Td. The error amplifier 110 is electrically connected to one of input ends of the comparator CMP. A compensation capacitor C is electrically connected to both the output end of the error amplifier 110 and the one of the input ends of the comparator CMP through a resistor R. A load, such as a LED module 10, and a capacitor Co are electrically connected to the operative node Q through a diode D. A current sink 20 is electrically connected between the LED module 10 and one of input ends of the error amplifier 110. In this embodiment, the LED module 10 can includes a plurality of LEDs electrically connected in series and/or in parallel.

In operation, the error amplifier 110 is configured to receive a fixed reference voltage Vref and a varying feedback voltage Vfb, and to charge the compensation capacitor C with an error current Icmp in response to a comparison between the reference voltage Vref and the feedback voltage Vfb. The comparator CMP is configured to receive a compensation voltage Vcmp of the compensation capacitor C and a ramp voltage Vramp (i.e., a saw-tooth-shaped signal), and to provide a driving voltage Vd to the driving transistor Td in response to a comparison between the compensation voltage Vcmp and the ramp voltage Vramp.

The driving transistor Td is configured to be operatively driven (i.e., turned on) by the driving voltage Vd, to operatively charge the capacitor Co through a current delivered by the inductor L. The LED module 10 is configured to be driven by a voltage Vo of the capacitor Co. The current sink 20 is configured to provide the feedback voltage Vfb corresponding to the voltage Vo to the error amplifier 110, and to provide a stabilization mechanism of the LED module 10.

In this embodiment, the error amplifier 110 can charge the compensation capacitor C with the relatively high error current Icmp during the start-up period (i.e., period T1 in FIG. 3), so as to shorten the start-up period of the driving circuit 100. On the other hand, the error amplifier 110 can charge the compensation capacitor C with the relatively low error current Icmp during the operating period (i.e., period T2 in FIG. 3), so as to prevent the driving circuit 100 from oscillating.

Figure 2:
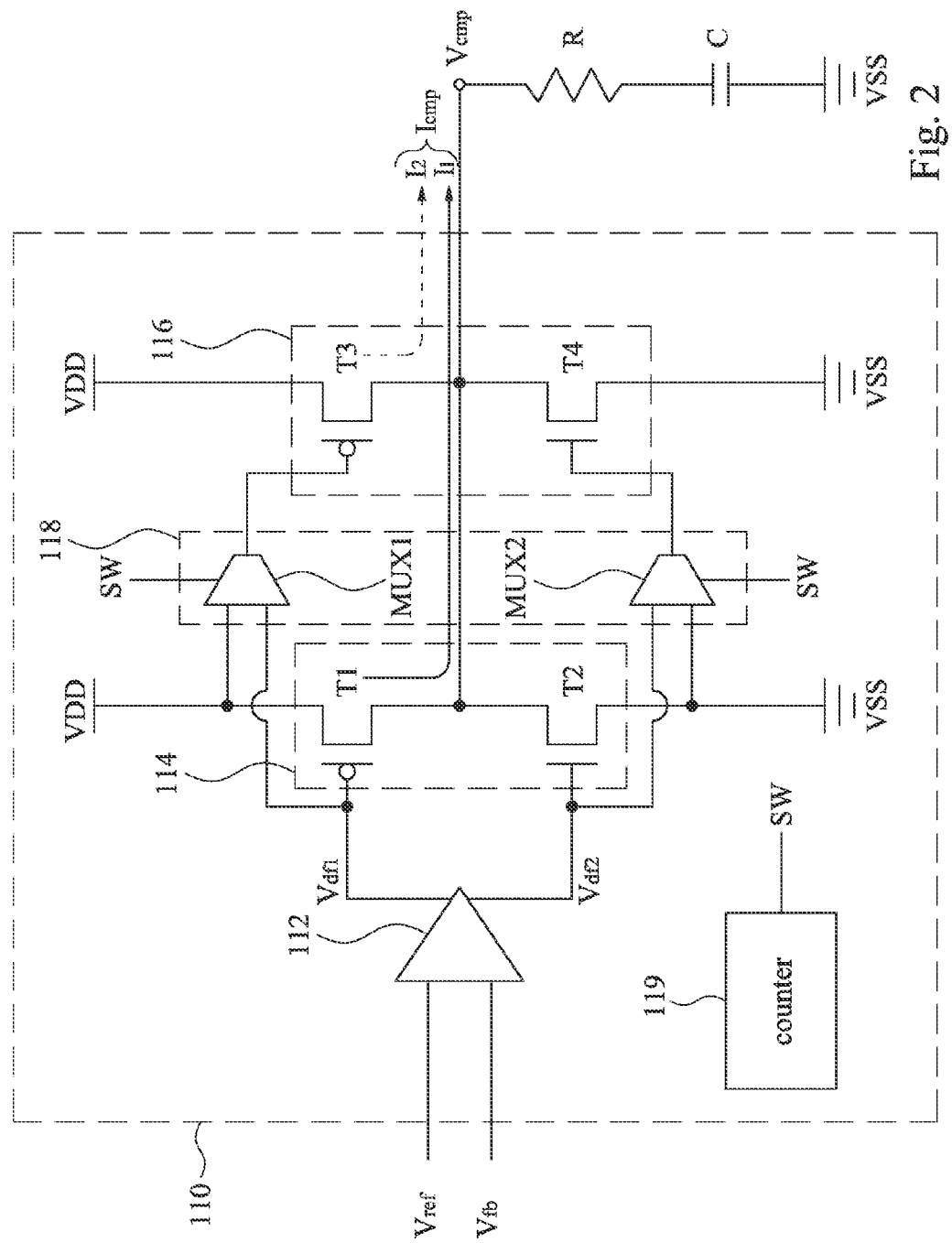
FIG. 2 is a schematic diagram of an error amplifier in accordance with one embodiment of the present disclosure.

FIG. 2 is a schematic diagram of the error amplifier 110 in accordance with one embodiment of the present disclosure. In this embodiment, the error amplifier 110 can include an input stage 112, a main output stage 114, an auxiliary output stage 116, and an activating module 118. The input stage 112 is electrically connected to the main output stage 114, the auxiliary output stage 116, and the activating module 118. Both the main output stage 114 and the auxiliary output stage 116 are electrically connected to the compensation capacitor C. The activating module 118 is electrically connected to both the main output stage 114 and the auxiliary output stage 116.

The input stage 112 is configured to provide a first differential output signal Vdf1 and a second differential output signal Vdf2 in response to a comparison between the reference voltage Vref and the feedback voltage Vfb. For example, in a period when the reference voltage Vref is greater than the feedback voltage Vfb, the input stage 112 provides the first differential output signal Vdf1, and in a period when the feedback voltage Vfb is greater than the reference voltage Vref, the input stage 112 provides the second differential output signal Vdf2.

The main output stage 114 is configured to charge or discharge the compensation capacitor C according to the first differential output signal Vdf1 and the second differential output signal Vdf2. For example, in a period when the first differential output signal Vdf1 is received, the main output stage 114 charges the compensation capacitor C, and in a period when the second differential output signal Vdf2 is received, the main output stage 114 discharges the compensation capacitor C.

The activating module 118 is configured to receive the first differential output signal Vdf1, the second differential output signal Vdf2, and a switching signal SW, and to determine whether to provide the first differential output signal Vdf1 and the second differential output signal Vdf2 to the auxiliary output stage 116 according to the switching signal to activate the auxiliary output stage 116.

The auxiliary output stage 116 is configured to be activated by the activating module 118 to charge the compensation capacitor C or discharge the compensation capacitor C according to the first differential output signal Vdf1 and the second differential output signal Vdf2. For example, in a period when the first differential output signal Vdf1 is received, the auxiliary output stage 116 charges the compensation capacitor C, and in a period when the second differential output signal Vdf2 is received, the auxiliary output stage 116 discharges the compensation capacitor C.

In one embodiment, the auxiliary output stage 116 can be a copy of the main output stage 114, configured to operatively be activated to increase both the currents to charge and discharge the compensation capacitor C.

In a first operation, the main output stage 114 charges the compensation capacitor C with a main error current I1 (e.g., 15 mA). The auxiliary output stage 116 is activated by the activating module 118, to charge the compensation capacitor C with an auxiliary error current I2 (e.g., 150 mA). At this time, the error current Icmp (e.g., 165 mA), which is equal to the summary of the main error current I1 and the auxiliary error current I2, is increased.

In a second operation, the main output stage 114 charges the compensation capacitor C with a main error current I1 (e.g., 15 mA). The auxiliary output stage 116 is deactivated and does not charge the compensation capacitor C. At this time, due to the auxiliary error current I2 is zero, the error current Icmp (e.g., 15 mA), which is equal to the summary of the main error current I1 and the auxiliary error current I2, is decreased.

In such a configuration, the error amplifier with an adjustable error current can be implemented. By charging the compensation capacitor operatively with both the main and the auxiliary output stage of the error amplifier or with merely the main output stage of the error amplifier, a stable driving circuit 100 with the high start-up speed can be implemented.

In the following paragraphs, more details of the error amplifier 110 will be described. However, the invention is not limited to the following embodiments.

In one embodiment, the main output stage 114 can include a transistor T1 (e.g., an p-type CMOS) and a transistor T2 (e.g., a n-type CMOS). The first end of the transistor T1 can be electrically connected to a voltage VDD. The second end of the transistor T1 can be electrically connected to the compensation capacitor C. The gate end of the transistor T1 can receive the first differential output signal Vdf1. The first end of the transistor T2 can be electrically connected to a voltage VSS. The second end of the transistor T2 can be electrically connected to the compensation capacitor C. The gate end of the transistor T2 can receive the second differential output signal Vdf2.

In addition, the auxiliary output stage 116 can include a transistor T3 (e.g., an p-type CMOS) electrically connected in parallel to the transistor T1, and a transistor T4 (e.g., a n-type CMOS) electrically connected in parallel to the transistor T2. The first end of the transistor T3 can be electrically connected to a voltage VDD. The second end of the transistor T3 can be electrically connected to the compensation capacitor C. The gate end of the transistor T3 can receive the first differential output signal Vdf1. The first end of the transistor T2 can be electrically connected to a voltage VSS. The second end of the transistor T2 can be electrically connected to the compensation capacitor C. The gate end of the transistor T2 can receive the second differential output signal Vdf2.

In this embodiment, a ratio between a channel width of the transistor T1 and a channel width of the transistor T3 (e.g., 1:10) can be equal to a ratio between a channel width of the transistor T2 and a channel width of the fourth transistor T4. In other word, the transistor T3 can be a copy of the transistor T1, configured to operatively be activated to increase the current to charge the compensation capacitor C. The transistor T4 can be a copy of the transistor T2, configured to operatively be activated to increase the current to discharge the compensation capacitor C.

In such a configuration, during a period when the auxiliary output stage 116 is activated, if overcharged, the compensation capacitor C can release the charges inside the compensation capacitor C quickly through the transistors T2 and T4. Therefore, the discharge speeds of the compensation capacitor C between periods when the auxiliary output stage 116 is activated and deactivated can be identical, so as to keep the driving circuit 100 from instability.

In this embodiment, the activating module 118 can include, for example, multiplexers MUX1, MUX2. The first input end of the multiplexer MUX1 is configured to receive the voltage VDD. The second input end of the multiplexer MUX1 is electrically connected to the gate end of the transistor T1 and is configured to receive the first differential output signal Vdf1. The control end of the multiplexer MUX1 is configured to receive the switching signal SW. The output end of the multiplexer MUX1 is electrically connected to the gate end of the transistor T3.

On the other hand, the first input end of the multiplexer MUX2 is configured to receive the voltage VSS. The second input end of the multiplexer MUX2 is electrically connected to the gate end of the transistor T2 and is configured to receive the second differential output signal Vdf2. The control end of the multiplexer MUX2 is configured to receive the switching signal SW. The output end of the multiplexer MUX2 is electrically connected to the gate end of the transistor T4.

In this embodiment, the multiplexer MUX1 is configured to multiplex the first differential output signal Vdf1 and the voltage VDD according to the switching signal SW, so as to operatively conduct the gate end of the transistor T1 to the gate end of the transistor T3, and to operatively provide the first differential output signal Vdf1 to the transistor T3. Similarly, the multiplexer MUX2 is configured to multiplex the second differential output signal Vdf2 and the voltage VSS according to the switching signal SW, so as to operatively conduct the gate end of the transistor T2 to the gate end of the transistor T4, and to operatively provide the second differential output signal Vdf2 to the transistor T4.

In one embodiment, the error amplifier 110 can further include a counter 119. The counter is configured to count the start-up period, and to provide the switching signal SW during the start-up period.

Figure 3:
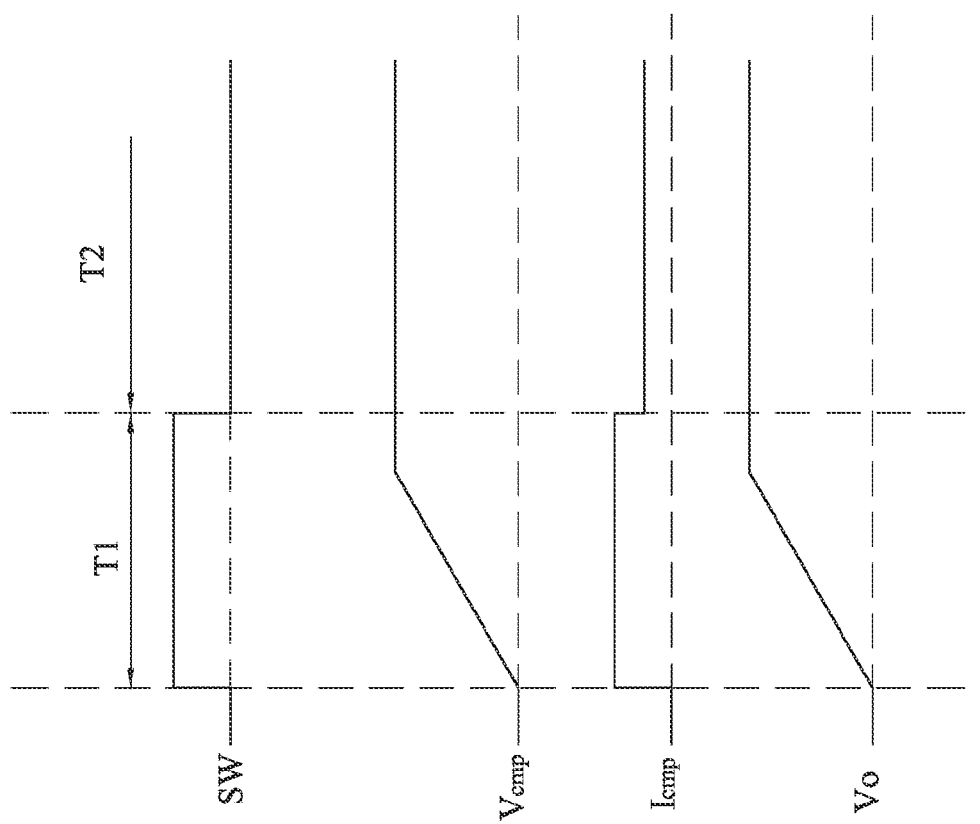
FIG. 3 is a timing diagram illustrating a switching signal, a compensation voltage, an error current, and an output voltage of the driving circuit in accordance with one embodiment of the present disclosure.

FIG. 3 is a timing diagram illustrating the switching signal SW, the compensation voltage Vcmp, the error current Icmp, and the output voltage Vout of the driving circuit 100 in accordance with one embodiment of the present disclosure.

In this embodiment, in a period T1 (e.g., start-up period), the counter 119 provides the switching signal SW (e.g., a high voltage level) to the multiplexer MUX1 and the multiplexer MUX2. The multiplexer MUX1 conducts the gate of the transistor T1 to the gate of the transistor T3, such that the transistor T1 and the transistor T3 can respectively be turned on in a same time according to the first differential output signal Vdf1 to make the compensation capacitor C be charged with both the main error current I1 and the auxiliary error current I2. At this time, the error current Icmp including the main error current I1 and the auxiliary error current I2 has a relatively high value.

On the other hand, the multiplexer MUX2 conducts the gate of the transistor T2 to the gate of the transistor T4, such that the transistor T2 and the transistor T4 can be turned on in a same time, and the compensation capacitor C can be discharged through the transistor T2 and the transistor T4 according to the second differential output signal Vdf2 in a period when the compensation capacitor C is overcharged.

In such a manner, both the compensation voltage Vcmp and the voltage Vo can be pulled to predetermined operating voltages quickly in the period T1, such that the driving circuit 100 can be activated and operating in a short time.

In a period T2 (e.g., operating period), the counter 119 does not provide the switching signal SW (e.g., provide a low voltage level) to the multiplexer MUX1 and the multiplexer MUX2. The multiplexer MUX1 conducts the voltage VDD with the gate of the transistor T3, such that transistor T3 is turned off. On the other hand, the multiplexer MUX2 conducts the voltage VSS with the gate of the transistor T4, such that transistor T4 is turned off. At this time, the error current Icmp including merely the main error current I1 has a relatively low value.

In such a manner, the capacitance of the compensation capacitor C can have a low value (e.g., 33 nC), and the driving circuit 100 can operate stably without oscillation during the period T2.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An error amplifier configured to charge a compensation capacitor with an error current, wherein the error amplifier comprises:
    an input stage configured to receive a reference voltage and a feedback voltage, and to provide a first differential output signal and a second differential output signal in response to a comparison between the reference voltage and the feedback voltage;
    a main output stage configured to receive the first differential output signal and the second differential output signal, and to charge the compensation capacitor; and
    an auxiliary output stage configured to receive the first differential output signal and the second differential output signal, and to be activated to charge the compensation capacitor;
    wherein in a first operation, both the main output stage and the auxiliary output stage charge the compensation capacitor; and
    in a second operation, the main output stage charges the compensation capacitor, and the auxiliary output stage is deactivated and does not charge the compensation capacitor.

2. The error amplifier as claimed in claim 1, wherein in the first operation, the auxiliary output stage is activated to increase the error current.

3. The error amplifier as claimed in claim 1, wherein in the second operation, the auxiliary output stage is deactivated to decrease the error current.

4. The error amplifier as claimed in claim 1, wherein the main output stage comprises:
    a first transistor configured to be turned on according to the first differential output signal; and
    a second transistor configured to be turned on according to the second differential output signal, and
    wherein the auxiliary output stage comprises:
    a third transistor configured to be turned on according to the first differential output signal; and
    a fourth transistor configured to be turned on according to the second differential output signal.

5. The error amplifier as claimed in claim 4, wherein a ratio between a channel width of the first transistor and a channel width of the third transistor is equal to a ratio between a channel width of the second transistor and a channel width of the fourth transistor.

6. The error amplifier as claimed in claim 1, further comprising an activating module, wherein the activating module is configured to receive the first differential output signal, the second differential output signal, and a switching signal, and to determine whether to provide the first differential output signal and the second differential output signal to the auxiliary output stage according to the switching signal to activate the auxiliary output stage.

7. The error amplifier as claimed in claim 6, wherein the activating module comprises:
    a first multiplexer configured to provide the first differential output signal to the auxiliary output stage according to the switching signal; and
    a second multiplexer configured to provide the second differential output signal to the auxiliary output stage according to the switching signal.

8. The error amplifier as claimed in claim 5, further comprising a counter configured to count a start-up period, and to provide a switching signal during the start-up period.

9. The error amplifier as claimed in claim 1, wherein the main output stage is configured to charge the compensation capacitor with a main error current, the auxiliary output stage is configured to charge the compensation capacitor with an auxiliary error current, and the error current is equal to a summation of the main error current and the auxiliary error current.

10. A driving circuit comprising:
    an inductor electrically connected between a voltage supply and an operative node;
    a driving transistor electrically connected to the operative node;
    an error amplifier electrically connected to a compensation capacitor, the error amplifier comprising:
        an input stage configured to provide a first differential output signal and a second differential output signal in response to a comparison between a fixed reference voltage and a varying feedback voltage;
        a main output stage configured to charge the compensation capacitor; and
        an auxiliary output stage configured to be activated to charge the compensation capacitor, wherein in a first operation, both the main output stage and the auxiliary output stage charge the compensation capacitor, and in a second operation, the main output stage charges the compensation capacitor and the auxiliary output stage is deactivated and does not charge the compensation capacitor; and
    a comparator electrically connected to the compensation capacitor, wherein the comparator is configured to provide a driving voltage to drive the driving transistor in response to a comparison between a ramp voltage and a compare voltage of the compensation capacitor.

11. The driving circuit of claim 10, wherein in the first operation, the error amplifier charges the compensation capacitor with a relative high current, and in the second operation, the error amplifier charges the compensation capacitor with a relative low current.

12. The driving circuit of claim 10, wherein the main output stage comprises:
    a first transistor configured to be turned on according to the first differential output signal; and
    a second transistor configured to be turned on according to the second differential output signal, and
    wherein the auxiliary output stage comprises:
    a third transistor electrically connected in parallel to the first transistor, and configured to be turned on according to the first differential output signal; and
    a fourth transistor electrically connected in parallel to the second transistor, and configured to be turned on according to the second differential output signal.

13. The driving circuit of claim 12, further comprising:
    a first multiplexer electrically connected between a gate end of the first transistor and a gate end of the third transistor, and configured to multiplex a first voltage and the first differential output signal according to a switching signal to operatively conduct the gate end of the first transistor to the gate end of the third transistor.

14. The driving circuit of claim 13, further comprising:
    a second multiplexer electrically connected between a gate end of the second transistor and a gate end of the fourth transistor, and configured to multiplex a second voltage and the second differential output signal according to the switching signal to operatively conduct the gate end of the second transistor and the gate end of the fourth transistor.

15. The driving circuit of claim 14, further comprising:
a counter configured to count a start-up period, and to provide the switching signal during the start-up period.

16. The driving circuit of claim 12, wherein a ratio between a channel width of the first transistor and a channel width of the third transistor is equal to a ratio between a channel width of the second transistor and a channel width of the fourth transistor.

17. An error amplifier comprising:
an input stage configured to receive reference voltage and a feedback voltage, and to provide a first differential output signal and a second differential output signal in response to a comparison between the reference voltage and the feedback voltage;
a first transistor electrically connected between a first voltage and a compensation capacitor, having a gate end configured to receive the first differential output signal;
a second transistor electrically connected between a second voltage and the compensation capacitor, having a gate end configured to receive the second differential output signal;
a third transistor electrically connected between the first voltage and the compensation capacitor, having a gate end configured to receive the first differential output signal; and
a fourth transistor electrically connected between the second voltage and the compensation capacitor, having a gate end configured to receive the second differential output signal;
wherein in a first operation, the first transistor, the second transistor, the third transistor, and the fourth transistor are activated to charge the compensation capacitor with a relative high current, and
wherein in a second operation, the first transistor and the second transistor are activated, and the third transistor and the fourth transistor are deactivated, such that the compensation capacitor is charged with a relative low current.

18. The error amplifier as claimed in claim 17, wherein a ratio between a channel width of the first transistor and a channel width of the third transistor is equal to a ratio between a channel width of the second transistor and a channel width of the fourth transistor.

19. The error amplifier as claimed in claim 17, further comprising:
a first multiplexer having a first input end electrically connected to the gate end of the first transistor, a second input end electrically connected to the first voltage, a control end configured to receive a switching signal, and an output end electrically connected to the gate end of the third transistor; and
a second multiplexer having a first input end electrically connected to the gate end of the second transistor, a second input end electrically connected to the second voltage, a control end configured to receive the switching signal, and an output end electrically connected to the gate end of the fourth transistor.

20. The error amplifier as claimed in claim 17, further comprising:
a counter configured to count a start-up period, and to provide a switching signal during the start-up period,
wherein in the first operation, the third transistor and the fourth transistor are activated corresponding to the switching signal, and
wherein in the second operation, the third transistor and the fourth transistor are deactivated corresponding to the switching signal.

* * * * *